United States Patent

Ito et al.

(10) Patent No.: US 6,352,639 B2
(45) Date of Patent: Mar. 5, 2002

(54) SUPERHEATING ATOMIZING STEAM WITH HOT FCC FEED OIL

(75) Inventors: Jackson I. Ito, Sacramento; Leonard Schoenman, Citrus Heights, both of CA (US); Dean C. Draemel, Kingwood, TX (US); Teh C. Ho, Bridgewater, NJ (US); George A. Swan, Baton Rouge, LA (US)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/735,779

(22) Filed: Dec. 13, 2000

Related U.S. Application Data

(63) Continuation of application No. 09/383,794, filed on Aug. 26, 1999, now abandoned.

(51) Int. Cl.[7] .............................................. C10G 11/00
(52) U.S. Cl. ........................ 208/113; 208/153; 208/157; 239/8
(58) Field of Search ................................ 208/113, 153, 208/157; 239/8

(56) References Cited

U.S. PATENT DOCUMENTS

| | | | |
|---|---|---|---|
| 1,751,719 A | 3/1930 | Uhri ............................ 239/8 |
| 2,358,386 A | 9/1944 | Doll ............................ 299/114 |
| 2,605,142 A | 7/1952 | Gold et al. ................... 299/114 |
| 2,891,000 A | 6/1959 | Metrailer ..................... 208/157 |
| 2,952,619 A | 9/1960 | Metrailer et al. .............. 208/157 |
| 3,071,540 A | 1/1963 | McMahon et al. .......... 208/163 |
| 3,606,154 A | 9/1971 | Tufts ............................ 239/8 |
| 3,671,424 A | 6/1972 | Saxton ........................ 208/127 |
| 3,750,947 A | 8/1973 | Hughes ........................ 239/11 |
| 3,881,701 A | 5/1975 | Schoenman et al. ............ 259/4 |
| 3,924,805 A | 12/1975 | Nebeker et al. ................ 239/1 |
| 4,128,206 A | 12/1978 | Bintner ........................ 239/11 |
| RE30,003 E | 5/1979 | Reed ............................ 239/11 |
| 4,151,955 A | 5/1979 | Stouffer ........................ 239/11 |
| 4,331,533 A | 5/1982 | Dean et al. .................. 208/113 |
| 4,353,504 A | 10/1982 | Girardin et al. ............... 239/14 |
| 4,398,664 A | 8/1983 | Stouffer ........................ 239/11 |
| 4,427,537 A | 1/1984 | Dean et al. .................. 208/120 |
| 4,434,049 A | 2/1984 | Dean et al. .................. 208/153 |
| 4,555,328 A | 11/1985 | Krambeck et al. .......... 208/157 |
| 4,653,692 A | 3/1987 | Bolot et al. .................. 239/427 |
| 4,740,290 A | 4/1988 | Tomita et al. ................. 208/67 |
| 4,743,358 A | 5/1988 | Kugler et al. ............... 208/120 |
| 4,784,328 A | 11/1988 | Skraba ........................ 239/432 |
| RE33,448 E | 11/1990 | Bauer ........................... 239/11 |

(List continued on next page.)

FOREIGN PATENT DOCUMENTS

| | | |
|---|---|---|
| EP | 0312428 A1 | 4/1989 |
| EP | 0593171 A1 | 4/1994 |
| WO | WO 96/27647 | 9/1996 |

*Primary Examiner*—Walter D. Griffin
(74) *Attorney, Agent, or Firm*—Michael A. Cromwell; James H. Takemoto

(57) ABSTRACT

An atomizing gas, such as steam, and a hot fluid comprising a hot liquid to be atomized, are passed under pressure, through separate fluid conduits in a heat exchange means, in which the hot liquid heats the steam to a superheat temperature, by indirect heat exchange. The superheated steam is then injected into the hot fluid, which comprises a two-phase fluid comprising steam and the hot liquid, subsequent to the superheated steam injection. The two-phase fluid is passed through an atomizing means, such as an orifice, into a lower pressure atomizing zone, which causes the steam to expand and atomize the liquid into a spray of liquid droplets. The two-phase fluid is formed before or as a consequence of the superheated steam injection and is preferably steam-continuous when passed through the atomizing means. This process is useful for atomizing a hot feed oil for a fluid cat cracking (FCC) process.

20 Claims, 3 Drawing Sheets

U.S. PATENT DOCUMENTS

| | | |
|---|---|---|
| 5,017,343 A | 5/1991 | Cetinkaya ................... 422/140 |
| 5,037,616 A | 8/1991 | Williatte et al. ............. 422/140 |
| 5,173,175 A | 12/1992 | Steffens et al. ............. 208/157 |
| 5,217,602 A | 6/1993 | Chan et al. ................. 208/161 |
| 5,251,436 A | 10/1993 | Brogan ........................ 60/254 |
| 5,289,976 A | 3/1994 | Dou et al. .................. 239/431 |
| 5,318,691 A | 6/1994 | Muldowney ................ 208/113 |
| 5,455,401 A | 10/1995 | Dumais et al. ........ 219/121.52 |
| 5,620,616 A | 4/1997 | Anderson et al. ...... 219/121.52 |
| 5,853,568 A | 12/1998 | Brander ...................... 208/160 |
| 6,003,789 A | 12/1999 | Base et al. .................. 239/433 |
| 6,093,310 A | 7/2000 | Swan ......................... 208/113 |
| 6,171,476 B1 | 1/2001 | Draemel et al. ............ 208/157 |
| 6,197,997 B1 | 1/2001 | Vedder, Jr. et al. ......... 208/113 |
| 6,199,768 B1 * | 3/2001 | Koveal et al. ................. 239/8 |

* cited by examiner

SUPERHEATING ATOMIZING STEAM WITH HOT FCC FEED OIL

CROSS-REFERENCE TO RELATED APPLICATIONS

This application is a continuation of U.S. patent application Ser. No. 09/383,794 filed Aug. 26, 1999 now abandon.

BACKGROUND OF THE DISCLOSURE

1. Field of the Invention

The invention relates to liquid atomization, in which atomizing gas is heated by indirect heat exchange with the hot liquid to be atomized. More particularly, the invention relates to a liquid atomization apparatus and process in which atomizing steam is heated to a superheat temperature and a high velocity, by indirect heat exchange with the hot liquid to be atomized. This is useful for atomizing the hot feed oil in an FCC process.

2. Background of the Invention

Atomizing hot, relatively viscous fluids at high flow rates, such as the heavy petroleum oil feeds used in fluidized catalytic cracking (FCC) processes, or fluid cat cracking as it is also called, is an established and widely used process in the petroleum refining industry, primarily for converting high boiling petroleum oils to more valuable lower boiling products, including gasoline and middle distillates such as kerosene, jet and diesel fuel, and heating oil. In an FCC process, the preheated oil feed is mixed with steam or a low molecular weight (e.g., $C_{4-}$) gas under pressure, to form a two phase fluid comprising the steam or gas phase and the liquid oil phase. This fluid is passed through an atomizing means, such as an orifice, into a lower pressure atomizing zone, to atomize the fluid into a spray of oil droplets which contact a particulate, hot cracking catalyst. Feed atomization is initiated immediately downstream of the atomizing orifice or means, and may continue into the downstream riser reaction zone. Steam is more often used than a light hydrocarbon gas, to reduce the vapor loading on the gas compression facilities and the downstream products fractionation. With the trend toward increasing the fraction of the very heavy and viscous residual oils used in FCC feeds, more and hotter steam is needed for atomization. However, many facilities have limited steam capacity and the steam is typically saturated, which constrains their ability to effectively process heavier feeds.

SUMMARY OF THE INVENTION

The invention relates to a fluidized cat cracking (FCC) process in which the hot feed oil is atomized with an atomizing gas, and wherein at least a portion of the atomizing gas has been heated by indirect heat exchange with the hot oil feed. The heat exchange takes place upstream of the atomizing means, in at least one heat exchange means which may comprise, for example, a heat conductive apparatus or body having a plurality of fluid passage means therein, with each fluid passage means having at least one fluid entrance and exit, to permit the gas and the hot oil to flow separately into and through, in indirect heat exchange, during which the hot oil heats the gas. By atomization is meant that the liquid feed oil is formed into a spray comprising discrete and dispersed, small drops or droplets of the oil. Atomization is achieved by conducting the fluid through at least one atomizing means, into a lower pressure atomizing zone. When more than one atomizing means is used, they may be in a series or parallel flow arrangement, preferably parallel. The heated atomizing gas preferably comprises steam, which may or may not be in admixture with one or more other gases, such as hydrocarbon gases and vapors. Thus, the term "steam" as used herein is not meant to exclude the presence of other gases in admixture with the steam. However, the atomizing gas preferably comprises at least 95 volume % steam and more preferably all steam. In the practice of the invention, the steam is heated to a superheat temperature and, in a preferred embodiment, the superheated steam exits the heat exchange means and is injected into the flowing, hot, oily fluid at a high velocity. By high velocity is meant a steam Mach number of preferably greater than 0.5, more preferably greater than 0.8, and still more preferably greater than 0.9. The hot oil flowing through the heat exchange means may be a single-phase fluid comprising the hot feed oil or a two-phase fluid comprising gas, as in preferably steam, and the hot oil. Hereinafter, the term "fluid" as used herein is meant to include both a single liquid phase, and a two-phase mixture comprising a gas phase and a liquid phase. The superheated steam, preferably at a high velocity, is injected into the flowing fluid to increase the surface area of the liquid phase. Increasing the velocity reduces the amount of steam required and increases the kinetic energy available for increasing the liquid surface area (e.g., $e=mv^2$), which is ultimately manifested by smaller droplet sizes of the atomized oil spray. The superheated steam may be injected into the flowing hot fluid either inside, outside, upstream or downstream of the heat exchange means. The superheated steam injection results in either (i) a two-phase fluid comprising the steam and hot feed oil or (ii) a two-phase fluid in which the surface area of the liquid phase has been increased. That is, if the hot fluid into which the steam is injected is a single-phase liquid, injecting the steam into the liquid produces a two-phase fluid comprising a steam phase and a liquid phase. If the fluid into which the steam is injected is a two-phase fluid comprising steam (or gas) and the hot liquid oil, injecting the steam into the fluid increases the surface area of the liquid phase of the fluid. The two-phase fluid is passed into and through an atomizing means and into a lower pressure atomization zone, in which the steam expands and forms a spray comprising atomized droplets of the oil. The atomizing means typically comprises a pressure reducing and velocity increasing orifice, as is known, but it may also comprise a pressure reducing and velocity increasing region or zone, just upstream of the lower pressure atomizing zone, in which the steam expands sufficiently to form the spray of oil droplets. The atomizing means may or may not comprise part of the heat exchange means, as is described in detail below. If it comprises part of the heat exchange means, it will typically be located proximate to its fluid exit. In another embodiment, all or a portion of the superheated steam formed in the heat exchange means may be directed as "shock steam" into the two-phase fluid, as it exits the atomizing means and enters the lower pressure atomizing zone, to provide a more uniform drop size distribution of the atomized oil.

In an FCC process in which at least a portion of the atomizing steam is heated to a superheat temperature according to the practice of the invention, the hot feed oil will typically be injected or mixed with a portion of the atomizing steam to form the two-phase fluid, prior to being injected with the superheated steam produced in the heat exchange means. This will typically occur upstream of the heat exchange means. A portion of this prior or upstream steam may be superheated, but is more typically all saturated steam. In one embodiment, the heat exchange means may include atomizing means such as an orifice. In another embodiment it will include means for mixing the two-phase fluid formed upstream to increase the surface area of the liquid feed oil phase. In the practice of the invention, the temperature drop incurred by the hot oily fluid flowing through the heat exchange means, as it heats the steam to a superheat temperature, will be typically less than 6° C. If saturated steam is passed into the heat exchange means, then passage of the steam through this means superheats the steam and this superheated steam is injected or impacted into the flowing hot fluid. If superheated steam is passed into the heat exchange means, its superheat temperature will be increased. In either case, the superheated steam heated or formed in the heat exchange means is directed into the flowing hot fluid as atomizing gas. Both the heat exchange and atomizing means will typically comprise part of a feed injection unit, which sprays the hot, atomized oil droplets into a cat cracker reaction zone, in which they contact hot catalyst particles which catalytically crack the hot oil into more valuable, and generally lower boiling, material. The injection unit will generally comprise a feed conduit in which a steam sparger is located, to form a two-phase fluid comprising the hot oil feed and the steam. The conduit feeds this two-phase fluid into the heat exchange means and the superheated steam formed in this means is injected into the flowing fluid to increase the surface area of the liquid phase. While a single-phase liquid fluid may be passed into the heat exchange means, in an FCC process it will more typically be a two-phase fluid comprising steam and the liquid feed oil. In an embodiment in which the heat exchange means also mixes the flowing fluid, the fluid will be a two-phase, steam-continuous fluid comprising a steam phase and the liquid feed oil phase. In any case, a two-phase fluid is formed before, or as a consequence of, the superheated steam injection and is preferably steam-continuous when passed through the atomizing means. The two-phase fluid is passed into and through atomizing means into a lower pressure atomizing zone in which the steam expands and the fluid is atomized to form a spray of oil droplets. A spray distribution means or tip, is preferably used to shape the spray of liquid droplets into the desired shape and is typically located proximate the downstream end of the injection unit. This spray distribution means is located downstream of the atomizing means or its upstream entrance may comprise atomizing means.

In the practice of the invention, the fluid pressure upstream of the downstream side of the atomizing means is higher than that in the atomizing or expansion zone(s). In an FCC process, the pressure of the fluid in the injector is above that in the atomizing zone which, in an FCC cat cracking reaction process either comprises, or opens into and is in direct fluid communication with, the cat cracking reaction zone. This reaction zone typically comprises a riser, as is known. Superheating the steam so that it is injected into the fluid at a high velocity will produce a smaller Sauter mean droplet diameter of the resulting atomized liquid, even with a very low fluid pressure drop (e.g., ~69 kPa) through the atomizing means or orifice. Injecting high velocity steam at a Mach number greater than 0.5 into the fluid, reduces the amount of steam needed for atomization, without increasing the size of the atomized liquid droplets. Vaporization of the feed in the shortest time possible leads to greater amounts of useful crackate products. Feed vaporization is a function of many factors, including the droplet size of the atomized feed liquid and the shape and uniformity of the atomized spray of liquid droplets.

In a broad sense, the process comprises an atomization process in which a hot fluid, comprising the liquid to be atomized flows through a heat exchange means, in indirect heat exchange with an atomizing gas, to heat the gas. In the context of the invention, the term "gas" is meant to include steam and/or any other gaseous material suitable for use as an atomizing fluid, such as for example, $C_{4-}$ hydrocarbon vapors, nitrogen and the like. However, in an FCC process it is typically all steam. The heated atomizing gas is injected at high velocity into the flowing hot fluid, to assist in atomizing the liquid in the fluid, into a spray of small droplets. As discussed, this fluid is atomized, by passing it through at least one atomizing means, such as an orifice and into a lower pressure atomizing zone. The fluid flowing through the heat exchange means may be a single phase of the liquid to be atomized or a two-phase fluid comprising the liquid and an atomizing gas. The fluid will comprise a two-phase fluid, and most preferably a gas-continuous, two-phase fluid, when passing through an atomizing orifice. This two-phase fluid is formed either before injecting the superheated steam into the fluid, or as a consequence of the superheated steam injection. In either case, the fluid will comprise a gas-continuous, two-phase fluid after the superheated steam injection. The pressure in the heat exchange means and upstream of the atomizing means is greater than that in the downstream atomizing zone. In a more detailed embodiment with respect to a typical FCC process, the invention comprises the steps of:

(a) injecting atomizing steam into a flowing, hot, liquid FCC feed oil under pressure, to form a two-phase fluid comprising the hot oil and steam;

(b) passing steam and the hot, two-phase fluid formed in (a) through separate conduits in a heat exchange means, in which the flowing hot fluid heats the steam to a superheat temperature, by indirect heat exchange with the fluid;

(c) injecting superheated heated steam formed in (b) into the hot fluid to increase the surface area of the liquid phase and form a steam-continuous two-phase fluid;

(d) passing the steam-continuous fluid through at least one atomizing means into at least one lower pressure atomizing zone to at least partially atomize said fluid and form a spray comprising droplets of said feed oil.

The spray may be formed in or near a cat cracking zone, or it may be conducted into the cat cracking reaction zone.

Further embodiments include: (i) contacting the spray with a particulate, hot, regenerated cracking catalyst in the reaction zone at reaction conditions effective to catalytically crack said feed oil and produce lower boiling hydrocarbons and spent catalyst particles which contain strippable hydrocarbons and coke; (ii) separating said lower boiling hydrocarbons produced in step (e) from said spent catalyst particles in a separation zone and stripping said catalyst particles in a stripping zone, to remove said strippable hydrocarbons to produce stripped, coked catalyst particles; (iii) passing the stripped, coked catalyst particles into a regeneration zone in which the particles are contacted with oxygen at conditions effective to burn off the coke and produce the hot, regenerated catalyst particles, and (iv) passing the hot, regenerated particles into the cat cracking zone.

DETAILED DESCRIPTION

Figure 1:
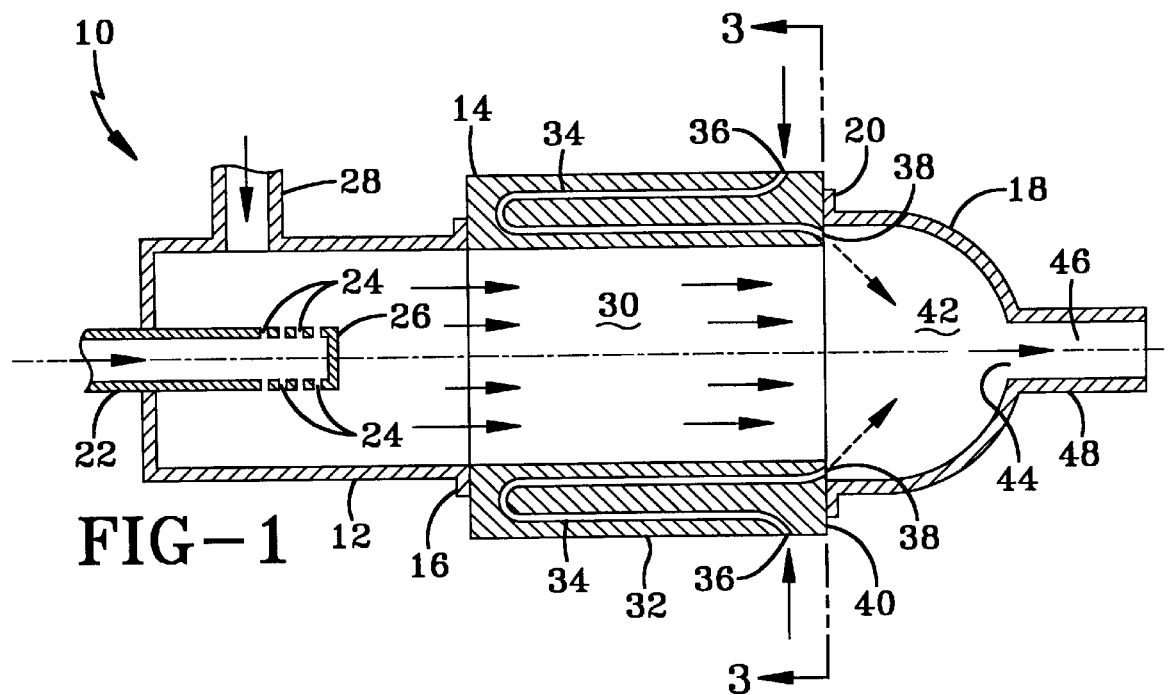
FIG. 1 is a simplified cross-sectional, schematic side view of an FCC feed injector employing the heat exchange means of the invention.

Important parameters include the mean droplet diameter and the droplet size distribution in the atomized oil feed sprayed into the riser reaction zone of an FCC process. Both smaller oil drop size and a more evenly distributed oil spray pattern may influence the oil feed vaporization rate and effective contact of the oil with the uprising, hot cracking catalyst particles in the riser. While not wishing to be bound, it is believed that the oil evaporation rate is inversely proportional to the droplet diameter to a power greater than unity. For example, a 25% reduction in the Sauter mean oil droplet diameter will boost the oil vaporization rate by from 35–50%. Longer oil vaporization times result in lower naphtha selectivity and higher yields of undesirable, low value thermal reaction products, such as hydrogen, methane, ethane, coke and high molecular weight material. Rapid vaporization of the oil feed becomes more important as the amount of heavier material, such as resids, reduced crudes and the like, added to the feed is increased. In general, as the amount of heavy material in the FCC feed is increased, the amount of gas added to the feed in the feed injector, to form a two-phase fluid comprising the feed liquid and gas upstream of the atomizing orifice, is increased to achieve adequate feed atomization. For FCC feed atomization, this gas is typically steam, the pressure drop across the atomizing orifice is less than 0.4 MPa and the atomized feed drop size is no more than 1,000 micrometers. It is preferred to achieve lower drop sizes and pressure drops across the orifice, such as no more than 300 micrometers and 0.2 MPa. It is also desirable to limit the amount of the steam used for atomization, to less than 5 wt. % steam based on the oil feed. The present invention reduces the amount of steam required and also the Sauter mean droplet size of the atomized oil.

The two-phase fluid fed into and through the atomizing means and also into a fluid mixing means or chamber in the process of the invention, may be gas or liquid continuous, or it may be a bubbly froth, in which it is not known with certainty if one or both phases are continuous. This may be further understood with reference to, for example, an open cell sponge and a closed cell sponge. Sponges typically have a 1:1 volumetric ratio of air to solid. An open cell sponge is both gas (air) and solid continuous, while a closed cell sponge is solid continuous and contains discrete gas cells. In an open cell sponge, the solid can be said to be in the form of membranes and ligaments (such as may exist in a two-phase gas-liquid froth or foam). In a closed cell sponge, the gas can be envisioned as in the form of discrete gas globules dispersed throughout the solid material. Some sponges fall in-between the two, as do some two-phase fluids comprising a gas phase and a liquid phase. It is not possible to have a sponge that is gas continuous and not also solid continuous, but it is possible to have a two-phase gas and liquid fluid that is gas continuous only. Therefore, the particular morphology of the fluid as it is passed into and through the heat exchange means of the invention, is not always known with certainty. Therefore, increasing the surface area of the liquid phase in the practice of the invention includes (i) forming a two-phase fluid of gas (e.g., steam) and liquid, (ii) reducing the thickness of any liquid membrane, (iii) reducing the thickness and/or length of any liquid rivulets, and (iv) reducing the size of any liquid globules in the fluid, either before or during the atomization. With a two-phase fluid comprising a gas phase and a liquid phase, the gas velocity is increased relative to the velocity of the liquid phase in a mixing zone. This velocity differential also occurs when the fluid passes through an orifice or zone of smaller cross-section perpendicular to the fluid flow direction, than the fluid passage or conduit means upstream of the orifice or zone (a pressure-reducing and velocity increasing orifice or zone). This velocity differential between the gas and liquid phases results in ligamentation of the liquid, particularly with a viscous liquid, such as a hot FCC feed oil. By ligamentation is meant that the liquid forms elongated globules or rivulets. The velocity differential is greatest during impingement mixing and decreases during shear mixing. Thus, passing a two-phase fluid through a pressure-reducing orifice, or impingement and/or shear mixing it, produces a velocity differential between the gas and liquid which results in ligamentation of the liquid and/or dispersion of the liquid in the gas due to shearing of the liquid into elongated ligaments and/or dispersed drops. The atomizing zone is at a lower pressure than the pressure upstream of the atomizing orifice. Consequently, the gas in the fluid passing through the atomizing orifice or means rapidly expands, thereby dispersing the liquid rivulets and/or droplets into the atomizing zone. Any rivulets present break into two or more droplets during the atomization. The atomizing orifice may be a discrete, readily discernable orifice, or it may be in the form of a region or zone of the smallest cross-sectional area upstream of the atomizing zone. In the strictest technical sense, atomization sometimes refers to increasing the surface area of a liquid and this occurs when the steam or other atomizing gas is mixed with, or injected into, the liquid to be atomized. However, in the context of the invention, atomization means that as the fluid passes through the atomizing orifice or zone, the liquid phase breaks up, or begins to break up, into discrete masses in the gas phase and this continues as the fluid continues downstream and the liquid is atomized into a spray of droplets dispersed in the gas phase. In the embodiment in which the superheated steam formed in the heat exchange means is injected into the flowing liquid prior to the formation of a two-phase fluid, the steam injection will form a two-phase fluid.

Turning to FIG. 1, an FCC feed injector 10 is shown as comprising a hollow, cylindrical conduit 12, connected at its downstream end to heat exchange means 14 by means of flange 16, which is fastened (preferably bolted) (not shown) to the upstream end of the heat exchange means. The downstream or exit end of the heat exchange means is fastened (preferably bolted or welded) (not shown) to a fan-type of atomizing means 18, via flange 20. A steam sparger comprising a cylindrical, hollow pipe or conduit 22, extends into the upstream end of conduit 12. Sparger 22 terminates at its downstream end in a wall means 26, and has a plurality of holes 24 circumferentially spaced around its outer periphery at its downstream end portion. These holes are radially drilled through the cylindrical wall of 22, into the interior portion of the pipe and define the sparging zone. Hot feed oil enters conduit 12 via feed line 28 and flows downstream, past the steam sparging holes 24, which comprise a first sparging zone, and towards heat exchange means 14. Sparging steam is passed into and through sparger 22 until it reaches the sparging holes 24, at which point it passes radially out into the flowing hot oil feed, to form a two-phase fluid comprising steam and the hot oil feed. The pressure drop through steam sparging holes 24 is typically less than 69 kPa, resulting in relatively low sparging steam velocity. Both the sparging steam and hot oil are at a pressure above atmospheric and above the pressure in the downstream atomization or expansion zone. The end wall 26 could have a diameter greater than that of conduit 22, to provide a baffle type of static mixing means at the downstream end of the first sparging zone. In an embodiment, in which all of the atomizing steam is injected as superheated high velocity steam into the hot oil at the downstream end of the heat exchange means, there is no need for an upstream sparger. The two-phase fluid formed by the sparging steam flows towards heat exchange means 14, which comprises a solid, heat-conducting metal, cylindrical body having, in this embodiment, an interior cylindrical bore 30, through which the two-phase fluid flows towards the atomizing means 18. Heat exchange means 14 also contains a plurality of steam passages circumferentially arranged in the thick wall 32 of the nozzle, of which only two, are shown for convenience. In this embodiment, each steam passage is identical and comprises a conduit 34, having a steam entrance 36, into which steam is passed by steam lines (not shown) indicated by the two arrows. Alternately, one or more separate, annular cavities, concentric with bore 30 and with each other, may be in wall 32, with each cavity comprising a steam passage, having at least one steam entrance and terminating in a plurality of superheated steam exits located circumferentially around the fluid exit of the heat exchange means. This embodiment is not shown. The steam exits may be located in the exterior downstream end wall as shown in FIG. 1 and in FIG. 3, or extending through and circumferentially arrayed around the interior wall of the bore 30, proximate the downstream end, as shown in FIG. 2. These are merely two illustrative, but non-limiting examples, as will be appreciated by those skilled in the art. In this embodiment, the bore 30 is approximately of the same diameter as that of feed conduit 12, to minimize the pressure drop of the fluid through the heat exchange means. A plurality of baffles, tabs, or longitudinal ribs extending radially inward from the surface of the bore, could be used to increase the available heat transfer surface for the fluid flowing through the heat exchange means and/or as static mixing means. In the embodiment shown, each steam passage makes two passes through the interior of the thick heat exchange means wall 32, parallel to the longitudinal axis of the heat exchange means, although more or less passes and configurations may be used, if necessary or desired, depending on relative temperatures, flow rates, etc. In this embodiment, the heat transfer surface for heating the steam is determined by the length and diameter of the channel or bore. The superheated steam produced in the heat exchange means exits at a plurality of orifices 38 in the downstream wall 40 of the heat exchange means and is injected into the fluid flowing out of the heat exchange means and into cavity 42, of the atomizing means 18. The steam is injected into the exiting fluid at an angle preferably greater than 60° to the longitudinal axis of the bore of the heat exchange means, as shown by the two dashed arrows. In the case where the fluid flowing through the heat exchange means is a single phase comprising the liquid oil, the steam forms a two-phase fluid comprising the steam and liquid oil for the subsequent atomization. For a two-phase fluid comprising steam and liquid oil, the impact of the hot steam into the fluid exiting the heat exchange means increases the surface area of the liquid phase. This steam is at a higher velocity than the upstream sparging steam. When the injected steam is high velocity steam at a Mach number of greater than 0.5, then it acts as shock steam which is more effective for converting the kinetic energy to surface tension energy, as reflected in increased surface area of the liquid phase. The convergence zone 42 of the atomizing means 18, minimizes coalescence of the dispersed oil globules, by directing the flowing fluid into the atomizing orifice 44. In this embodiment, the atomizing orifice 44 is rectangular in shape, with its plane normal to the longitudinal axis of the injector and fluid flow. In plan view (not shown) the width of the orifice is greater than the height shown in FIG. 1. The cross-sectional area of the plane of the atomizing orifice opening normal to the fluid flow direction, is smaller than the internal cross-sectional area of the feed conduit 12 and bore 30 in heat exchange means 14, normal to the fluid flow direction. This increases the velocity of the fluid flowing through the atomizing orifice 44 and results in both a pressure drop across the orifice and an increase in the velocity of the fluid flowing through, which further shears the fluid and initiates fluid atomization. The fluid passes through the atomizing orifice into a lower pressure atomizing zone 46, in which it expands and forms a spray of dispersed liquid droplets. Atomization begins just downstream of orifice 44 in the hollow interior 46 of atomizing tip 48 and continues into the interior of the riser reaction zone (not shown), into which tip 48 extends. In plan view (not shown), tip 48 is fan-shaped, like that shown in FIG. 2(*b*), to produce a relatively flat and uniform, fan-shaped spray of the atomized oil, for maximum uniform contact of the oil with the hot, uprising regenerated catalyst particles in the riser reaction zone. This type of atomizing unit is known and disclosed in U.S. Pat. No. 5,173,175, the disclosure of which is incorporated herein by reference. As an illustrative, but non-limiting example of operation of the steam injector of FIG. 1, preheated feed oil (with or without the upstream or first sparger-added steam to form a two-phase fluid or foam) for the FCC enters the injector at a temperature above 260° C., with a typical flow rate ranging between 4.5 to 13.6 kg/sec. With 1.1 MPa saturated steam at 182° C., the steam flow rate into the heat exchange means will vary from 0.5 to 5 wt. % of the oil feed, or between about 0.02 to 0.7 kg/sec. Heat exchange between the hot oil and steam flowing through the heat exchange means will achieve from 28 to 139° C. of steam superheat, with negligible cooling of the oil (e.g., <6° C.). The multi-point injected, superheated steam impacting the hot oil near the heat exchange means outlet, facilitates the breakup of the oil into small diameter droplets and can be considered as "shock" steam. In the embodiment of FIG. 1, a small fraction of the saturated process steam (e.g., 0.1 to 1.0 wt. % of the oil) is separately sparged into the oil upstream of the heat exchange means, to create the steam-continuous, two phase fluid which can be described as a "foam". In this case, the amount of superheated steam formed in the heat exchange means and injected into the two-phase fluid will typically comprise from 0.5 to 2.5 wt. % of the oil feed. This is less than what would typically be required without the superheated steam and process of the invention, to achieve comparable oil atomization.

Figure 3:
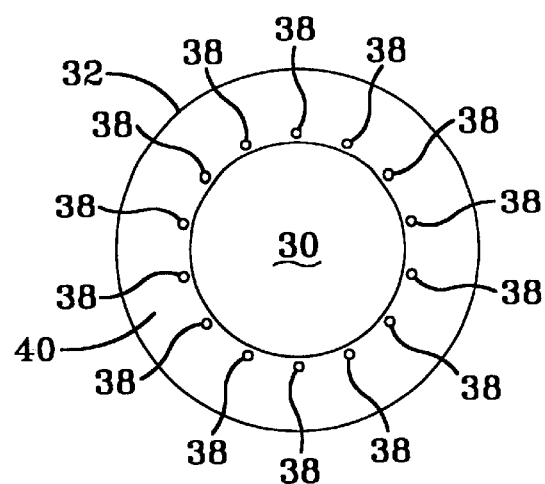
FIG. 3 is a view showing the steam injection ports on the downstream outer end of the heat exchange means shown in FIG. 1.
Figure 2A:
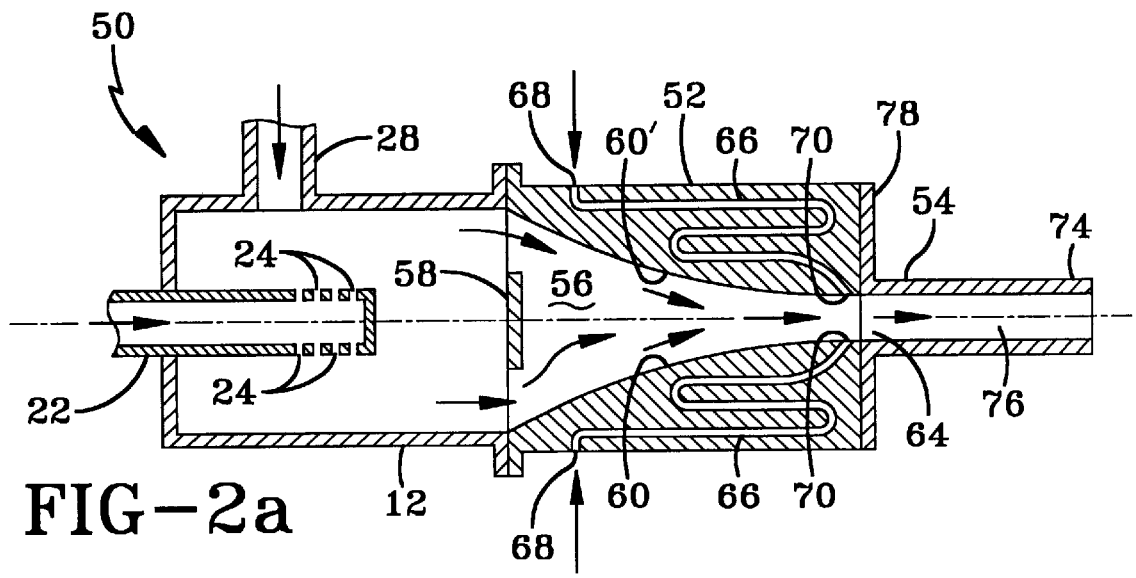
FIGS. 2(a) and 2(b) are simplified, cross-sectional, schematic side and plan views of an FCC feed injector of the invention, in which the heat exchange means also mixes the two-phase fluid.
Figure 2B:
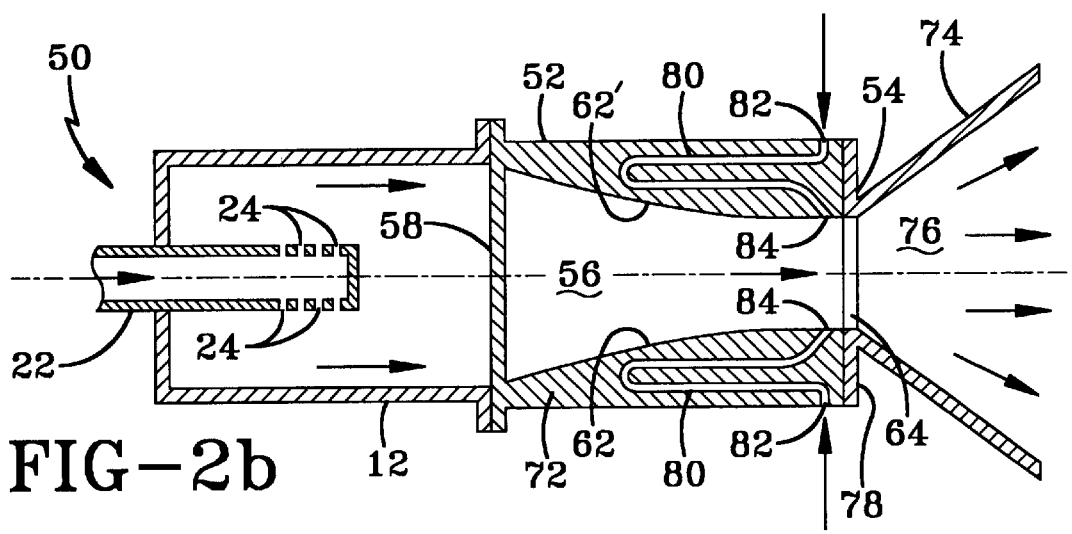

FIGS. 2(*a*) and 2(*b*) illustrate respective side and top cross-sectional views of another embodiment of the practice of the invention, in which the superheated steam from the heat exchange means is injected into the fluid from inside the heat exchange means bore, proximate the fluid exit which, in this embodiment, comprises the atomizing orifice. Thus, an FCC feed oil injector 50, comprises a hot feed conduit 12, steam pipe 22 with holes 24 radially drilled through it around the downstream end, for sparging saturated steam into the incoming hot oil, a heat exchange means 52 which produces superheated steam and a combination spray distributor and atomizing means 54, having a fan-shaped spray distributor or tip 74. The hot oil conduit and sparger are the same as in FIG. 1 and provide the same functions in this embodiment. Heat exchange means 52 also comprises a heat conducting, cylindrical metal body containing a longitudinal bore 56 within, which is open at both ends and extends through the heat exchange means from its upstream to its downstream end. The bore provides the fluid flow path through the heat exchange means and has a stream divider 58 at its upstream entrance. The interior of bore 56 is somewhat venturi-shaped, with its cross-sectional area normal to the fluid flow direction, gradually decreasing to a minimum at the downstream exit end. Referring to FIG. 2(*a*), the stream splitter 58 splits the incoming fluid into two separate streams to provide both impingement and shear mixing in the chamber, with a minimal pressure drop through the bore. Preferably, the two streams are symmetrical and diametric. The downstream exit of the bore comprises the atomizing orifice. The combination of impingement and shear mixing in the chamber increases the surface area of the liquid phase in the two-phase fluid flowing fluid. This surface area increase is manifested by smaller oil droplets dispersed in the steam continuous phase. Unlike the embodiment of FIG. 1, in which the use of sparging steam (or comprising superheated steam produced by the means) upstream of the heat exchange means may be optional, in this embodiment it is particularly preferred, in order to obtain the full benefits of the mixing in the heat exchange means. That is, in the embodiment of FIG. 2, it is preferred that a two-phase fluid, and most preferably a steam continuous two-phase fluid, is passed into and through the heat exchange means 52. Two different pairs of opposing walls form bore 56. Thus, as shown in FIG. 2(*a*), the surface of identical and opposing walls 60 and 60' is in a direction normal to the plane of the paper and convexly or inwardly curved, with respect to the longitudinal axis of the heat exchange means as shown. The maximum curvature is shown at the upstream portion of the bore, with the amount of curvature decreasing in a downstream direction. The other pair of identical and opposing walls that define the bore are shown in FIG. 2(*b*) as 62 and 62'. Walls 62 and 62' are shown as slightly converging in the downstream direction and have a surface perpendicular to he plane of the paper. A rectangular-shaped bore 56 is formed by the intersection of the two wall pairs, which comprises the fluid mixing chamber, having a rectangular cross-section normal to the longitudinal axis of the heat exchange means (parallel to the flat fluid entrance and exits at opposite ends of the means) and overall fluid flow direction, with the cross-sectional area of the chamber progressively decreasing along the downstream direction, and which form a rectangular-shaped atomizing orifice 64, at the downstream exit end of the heat exchange means. Stream divider 58 divides the two-phase, steam continuous fluid formed by the upstream steam injection into the hot oil, into two diametrically symmetrical and separate streams. The two separate streams flow into the upstream portion of the bore where the convex curvature provides both radially inward and axially downstream flow vectors. The radially inward flow component imparted to the inflowing fluid forces a portion of each stream to impinge against the other, for maximum mixing forces, to increase the surface area of the liquid phase of the flowing fluid. However, continued violent impingement mixing may coalesce a portion of the now-dispersed droplets. Therefore, the inward curvature of walls 60 and 60' continuously decreases in the downstream flow direction, to provide primarily mild shear mixing from friction along the walls down to the orifice 64. Fluid mixing is maximized as the two streams first enter bore 56, but continuously decreases in intensity as the fluid progresses downstream through the bore. This provides a fluid having maximum area increase of the liquid phase, with little subsequent coalescence and a low pressure drop through the heat exchange means. The other pair of opposing walls 62 and 62', gradually approach each other in the downsteam direction to the orifice 64, in order to minimize pressure loss of the fluid through the bore to the atomizing orifice and maximize the fluid velocity through the orifice. Only two identical steam channels 66 are shown in FIG. 2(*a*), for convenience, each with a steam inlet 68 and outlet 70. These channels extend through the thick, outer metal wall portion 72, of the heat exchange means. The outlets 70 are angled acute to the outflowing fluid and are positioned in the bore wall upstream and proximate to the orifice 64, to impact the outflowing fluid with the superheated, and preferably also high velocity steam, for further reducing the droplet size of the subsequently atomized oil spray. In the feed conduit and heat exchange means, the fluid is under superatmospheric pressure. The riser reaction zone (not shown), into which the downstream portion of the injector (e.g., the atomizing tip) protrudes, is at a lower pressure than that in the feed injector. As the two-phase, steam continuous fluid passes through to the downstream end of the heat exchange means, the superheated steam is injected into the fluid as a plurality of jets, further increasing the liquid phase surface area, to form a more uniform spray of smaller oil droplets during fluid atomization. The superheated steam injected into the fluid inside the heat exchange means is at a higher pressure than the fluid. This increases the volumetric flow rate of the fluid and contributes to a further reduction in the droplet size of the dispersed and ultimately atomized oily liquid. This steam is either shock steam or shear steam, depending on whether the steam is injected at supersonic or subsonic velocity, respectively. The two-phase fluid passes through the rectangular atomizing orifice, which comprises the fluid exit of the heat exchange means and the adjacent fluid entrance of the atomizing means 54. The heat exchange means exit and upstream entrance to the interior 76 of the fan-shaped atomizing tip, are identical in size and shape. As mentioned above, this orifice is rectangular in shape, with a cross-sectional area perpendicular to the longitudinal axis of the injector, substantially less than that of the cross-sectional area of the fluid conduit 12 and the fluid entrance of the heat exchange means. The spray distributor or tip 74 of the atomizing unit 54 is fan-shaped and hollow, as shown by FIGS. 2(*a*) and 2(*b*). This provides a fan-shaped, controlled expansion-atomization zone 76, for injecting a flat, fan-shaped atomized spray of the small oil droplets, into the uprising hot, regenerated catalyst particles, in the riser reaction zone of the FCC unit. Atomizing unit 54 may be metallurgically bonded, welded, or brazed to the heat exchange means via flange 78. In FIG. 2(*b*), only two, identical steam passages 80 are shown in the thick and otherwise solid circumferential wall portion 72, of the heat exchange means. The steam, which may be saturated or superheated steam, enters the steam passages by inlet means 82, as indicated by the two respective arrows. The steam outlets 84 are angled so as to inject the steam at an acute angle into the flowing fluid, as indicated by the two arrows. In this embodiment, the steam is injected into the flowing oily fluid at a forward acute angle greater than 60°, to impart both a radially inward and a forward flow and shear component to the injected steam. This maximizes the differential steam velocity between the injected steam and the flowing oily fluid. In yet another embodiment (not shown), the steam shown in FIG. 2(a) could be injected at an acute angle into the fluid in the upstream direction. In yet another embodiment (not shown) the cross-sectional area of the bore 56 could progressively decrease in the downstream direction and then increase. In this case, atomization will initiate at the point or region of smallest cross-section, which will comprise the atomization region or zone, as opposed to a readily discernable orifice. FIG. 3 is a simplified downstream end view of the heat exchange means 14 shown in FIG. 1, to illustrate the plurality of superheated steam exits 38, circumferentially arrayed around the downstream exit of the heat exchange means. While these steam outlets are depicted as circular, they could be rectangular slits or any other shape. The heat exchange means of the invention can be fabricated in a number of different ways, at the discretion of the practitioner. Thus a lost wax or investment casting process could be employed, as well as forging and other casting processes. The nozzle may be fabricated of a ceramic, metal or combination thereof. Fabrication of a nozzle using a plurality of stacked, relatively thin metal plates or platelets, having fluid passage means therein, is known and disclosed as useful for rocket motors and plasma torches in, for example, U.S. Pat. Nos. 3,881,701 and 5,455,401. This fabrication technique is also useful in fabricating nozzles of the invention. The choice of fabrication method is left to the discretion of the practitioner.

Figure 4:
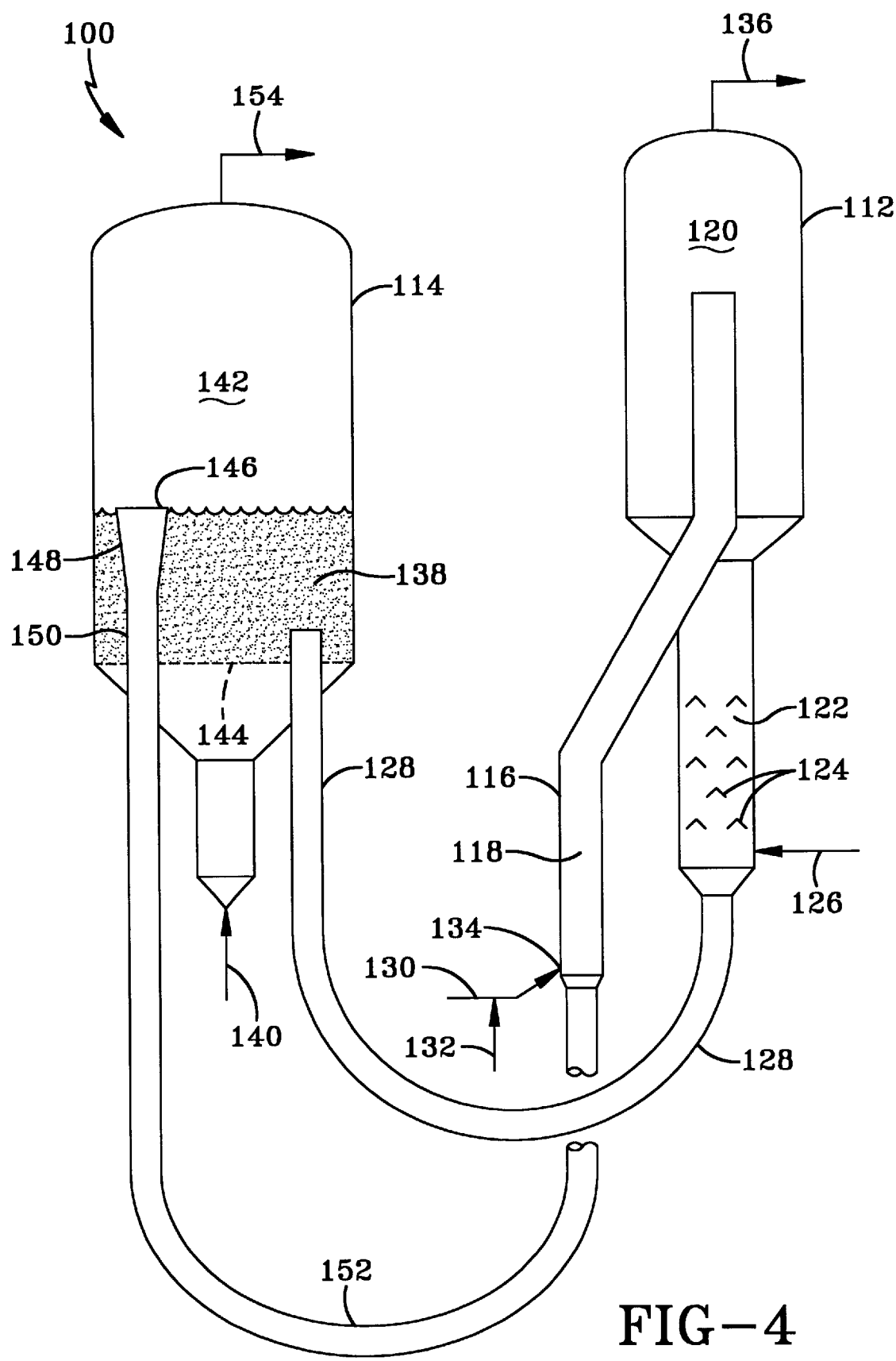
FIG. 4 is a schematic of a cat cracking process useful in the practice of the invention.

FIG. 4 is a simplified schematic of a fluid cat cracking process used in conjunction with the feed injection method of the invention. Turning to FIG. 4, an FCC unit 100 useful in the practice of the invention is shown as comprising a catalytic cracking reactor unit 112 and a regeneration unit 114. Unit 112 includes a feed riser 116, the interior of which comprises the catalytic cracking reaction zone 118. It also includes a vapor-catalyst disengaging zone 120 and a stripping zone 122 containing a plurality of baffles 124 within, in the form of arrays of metal "sheds" which resemble the pitched roofs of houses. A suitable stripping agent such as steam is introduced into the stripping zone via line 126. The stripped, spent catalyst particles are fed into regenerating unit 114 via transfer line 128. A preheated FCC feed is passed via feed line 130 into a feed injector (not shown) containing a heat exchange means of the invention, which heats at least a portion of the dispersion steam according to any of the embodiments of the invention. Steam, from steam line 132, is fed into the hot oil feed according to any of the embodiments of the invention, to form a two-phase, gas continuous mixture of the steam and hot oil which is passed through an atomizing orifice in the injector and into the base of riser 116 as a flat, fan-shaped spray, at feed injection point 134. The feed injector is not shown in FIG. 5 for the sake of simplicity. In a preferred embodiment, a plurality of feed injectors may be circumferentially located around the feed injection area of riser 116. A preferred feed comprises a mixture of a vacuum gas oil (VGO) and a heavy feed component, such as a resid fraction. The hot feed is contacted with particles of hot, regenerated cracking catalyst in the riser. This vaporizes and catalytically cracks the feed into lighter, lower boiling fractions, including fractions in the gasoline boiling range (typically 38–204° C.), as well as higher boiling jet fuel, diesel fuel, kerosene and the like. The cracking catalyst is a mixture of silica and alumina containing a zeolite molecular sieve cracking component, as is known to those skilled in the art. The catalytic cracking reactions start when the feed contacts the hot catalyst in the riser at feed injection point 134 and continue until the product vapors are separated from the spent catalyst in the upper or disengaging section 120 of the cat cracker vessel 112. The cracking reaction deposits strippable hydrocarbonaceous material and non-strippable carbonaceous material known as coke, to produce spent catalyst particles which must be stripped to remove and recover the strippable hydrocarbons and then regenerated by burning off the coke in the regenerator. Vessel 112 contains cyclones (not shown) in the disengaging section 120, which separate both the cracked hydrocarbon product vapors and the stripped hydrocarbons (as vapors) from the spent catalyst particles. The hydrocarbon vapors pass up through the reactor and are withdrawn via line 136. The hydrocarbon vapors are typically fed into a distillation unit (not shown) which condenses the condensable portion of the vapors into liquids and fractionates the liquids into separate product streams. The spent catalyst particles fall down into stripping zone 122 in which they are contacted with a stripping medium, such as steam, which is fed into the stripping zone via line 126 and removes, as vapors, the strippable hydrocarbonaceous material deposited on the catalyst during the cracking reactions. These vapors are withdrawn along with the other product vapors via line 136. The baffles 122 disperse the catalyst particles uniformly across the width of the stripping zone or stripper and minimize internal refluxing or backmixing of catalyst particles in the stripping zone. The spent, stripped catalyst particles are removed from the bottom of the stripping zone via transfer line 128, from which they are passed into fluidized bed 138 in regenerator 144. In the fluidized bed they are contacted with air entering the regenerator via line 140 and some pass up into disengaging zone 142 in the regenerator. The air oxidizes or burns off the carbon deposits to regenerate the catalyst particles and in so doing, heats them up to a temperature which preferably doesn't exceed about 760° C. and typically ranges from about 650–700° C. Regenerator 114 also contains cyclones (not shown) which separate the hot regenerated catalyst particles from the gaseous combustion products which comprise mostly CO, $N_2$, $H_2O$ and $CO_2$ and conveys the regenerated catalyst particles back down into fluidized catalyst bed 138, by means of diplegs (not shown), as is known to those skilled in the art. The fluidized bed 138 is supported on a gas distributor grid, which is briefly illustrated as dashed line 144. The hot, regenerated catalyst particles in the fluidized bed overflow the weir 146 formed by the top of a funnel 148, which is connected at its bottom to the top of a downcomer 150. The bottom of downcomer 150 turns into a regenerated catalyst transfer line 152. The overflowing, regenerated particles flow down through the funnel, downcomer and into the transfer line 152 which passes them back into the riser reaction zone 118, in which they contact the hot feed entering the riser from the feed injector. Flue gas comprising the combustion products referred to above is removed from the top of the regenerator via line 154.

Cat cracker feeds used in FCC processes typically include gas oils, which are high boiling, non-residual oils, such as a vacuum gas oil (VGO), a straight run (atmospheric) gas oil, a light cat cracker oil (LCGO) and coker gas oils. These oils have an initial boiling point typically above about 450° F. (232° C.), and more commonly above about 650° F. (343° C.), with end points up to about 1150° F. (621° C.), as well as straight run or atmospheric gas oils and coker gas oils. In addition, one or more heavy feeds having an end boiling point above 565° C. (e.g., up to 705° C. or more) may be blended in with the cat cracker feed. Such heavy feeds include, for example, whole and reduced crudes, resids or residua from atmospheric and vacuum distillation of crude oil, asphalts and asphaltenes, tar oils and cycle oils from thermal cracking of heavy petroleum oils, tar sand oil, shale oil, coal derived liquids, syncrudes and the like. These may be present in the cracker feed in an amount of from about 2 to 50 volume % of the blend, and more typically from about 5 to 30 volume %. These feeds typically contain too high a content of undesirable components, such as aromatics and compounds containing heteroatoms, particularly sulfur and nitrogen. Consequently, these feeds are often treated or upgraded to reduce the amount of undesirable compounds by processes, such as hydrotreating, solvent extraction, solid absorbents such as molecular sieves and the like, as is known. Typical cat cracking conditions in an FCC process include a temperature of from about 800–1200° F. (427–648° C.), preferably 850–1150° F. (454–621° C.) and still more preferably 900–1150° F. (482–621° C.), a pressure between about 0.14–0.52 MPa, preferably 0.14–0.38 MPa, with feed/catalyst contact times between about 0.5–15 seconds, preferably about 1–5 seconds, and with a catalyst to feed ratio of about 0.5–10 and preferably 2–8. The FCC feed is preheated to a temperature of not more than 454° C., preferably no greater than 427° C. and typically within the range of from about 260–427° C.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains. For example, although an FCC feed injector for atomizing an FCC oil feed has been disclosed, as a specific use of the process of the invention, the invention itself is not intended to be so limited. The practice of the invention may be employed with any liquid atomization process, in which it is advantageous to heat at lest a portion of the atomizing gas or to heat steam to a superheat temperature, by indirect heat exchange with the liquid or fluid flowing through the heat exchange means for any reason, including, but not limited to (i) forming a two-phase fluid comprising the liquid to be atomized and the atomizing gas and/or steam, and (ii) injecting the heated gas or steam into the hot liquid or fluid for atomization.

What is claimed is:

1. A fluid cat cracking process which comprises the steps of:
    (a) injecting steam into a flowing, hot, liquid FCC feed oil under pressure, to form a two-phase fluid comprising said hot oil and steam;
    (b) passing an atomizing gas comprising steam and said hot, two-phase fluid formed in (a) through separate conduits in a heat exchanger, in which said flowing hot fluid heats said steam to a superheat temperature, by indirect heat exchange with said fluid;
    (c) injecting superheated steam formed in (b) into said hot fluid to increase the surface area of said liquid phase and form a steam-continuous two-phase fluid;
    (d) passing said steam-continuous fluid through an atomizer into a lower pressure atomizing zone to atomize said fluid and form a spray comprising droplets of said feed oil, and
    (e) passing said spray into a cat cracking reaction zone.

2. A process according to claim 1 wherein said superheated steam formed in (b) is injected into said fluid at a position selected from the group consisting of: (i) upstream from said heat exhanger; (ii) downstream from said heat exchanger; (iii) within said heat exhanger, and, (iv) combinations thereof.

3. A process according to claim 2 wherein said superheated steam is injected into said fluid at a Mach number of a least 0.5.

4. A process according to claim 3 wherein said atomizer is located downstream of said heat exchanger.

5. A process according to claim 4 wherein said spray is fan-shaped.

6. A process according to claim 2 wherein said heat exchanger comprises said atomizer.

7. A process according to claim 2 wherein said heat exchanger comprises a mixer configured to mix said two-phase fluid flowing therethrough.

8. A process according to claim 7 wherein said two-phase fluid mixed in said heat exchanger is steam continuous.

9. A process according to claim 8 wherein said steam heated in said heat exchanger and then injected into said fluid is at a Mach number of at least 0.5.

10. A process according to claim 2 wherein said heat exchanger comprises part of an FCC feed injection unit which injects said spray into said cat cracking reaction zone.

11. A liquid atomization process in which a hot fluid comprising the liquid to be atomized flows through a heat exchanger, in indirect heat exchange with an atomizing gas to heat said gas, wherein said hot gas is injected into said flowing hot fluid which comprises a hot, two-phase fluid comprising said gas and liquid, subsequent to said gas injection, to reduce the surface area of said liquid and assist in atomizing said liquid in said fluid into a spray comprising drops of said liquid.

12. A process according to claim 11 wherein said two-phase fluid comprises a gas continuous fluid, which is atomized by passing it through an atomizer and into a lower pressure atomizing zone, to form said spray.

13. A process according to claim 12 wherein said fluid flowing through said heat exchanger comprises a single liquid phase.

14. A process according to claim 12 wherein a two-phase fluid comprising said liquid to be atomized and said atomizing gas flows through said heat exchanger.

15. A process according to claim 11 wherein said two-phase fluid is formed either before injecting said heated gas into said fluid, or as a consequence of injecting said heated gas into said fluid.

16. A process according to claim 15 wherein said two-phase fluid comprises a gas-continuous, two-phase fluid after injecting said hot gas into said fluid.

17. A process according to claim 15 wherein said heat exchanger comprises a mixer configured to mix said two-phase fluid flowing therethrough.

18. A process according to claim 16 wherein said heat exchanger comprises a mixer configured to mix said two-phase fluid flowing therethrough.

19. A process according to claim 11 wherein said gas heated in said heat exchanger and then injected into said fluid is at a Mach number of at least 0.5.

20. A process according to claim 16 wherein said gas heated in said heat exchanger and then injected into said fluid is at a Mach number of at least 0.5.

* * * * *